Patented Feb. 27, 1940

2,191,823

UNITED STATES PATENT OFFICE 2,191,823

AZO DYESTUFFS

Richard Fleischhauer and Adolf Müller, Frankfort-on-the-Main-Fechenheim, Germany, assignors to General Aniline & Film Corporation, a corporation of Delaware No Drawing. Application June 8, 1939, Serial No. 278,084. In Germany June 9, 1938

4 Claims. (Cl. 260—198)

The present invention relates to azo dyestuffs, more particularly to those of the general formula:

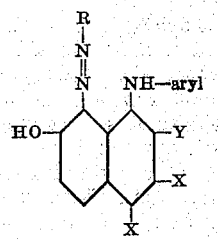

wherein one X stands for a sulfonic acid group and the other X stands for hydrogen, R stands for a member selected from the group consisting of aromatic radicles of the benzene and naphthalene series, Y stands for a member selected from the group consisting of hydrogen and —N=N—R, and aryl means a radicle of the benzene series.

The new dyestuffs are obtained by combining in an alkaline medium diazo compounds of aromatic amines of the benzene or naphthalene series with 1-arylamino-7-hydroxynaphthalene-mono-sulfonic acids or with substitution products thereof containing in the 2-position of the naphthalene nucleus the radicle of a diazo compound of the benzene or naphthalene series.

The dyeings obtained on wool and silk by means of the present new dyestuffs are distinguished by mostly deep olive-green to brown to black shades of generally very good fastness properties, especially of good fastness to light. It is also possible to vary the properties of the dyestuffs by a suitable selection of the diazo compounds employed for their manufacture, obtaining thereby, on the one hand, dyestuffs of an especially good levelling power, and on the other hand, such of a very good fastness to fulling, washing, perspiration and seawater. Dyestuffs prepared by employing o-aminophenols as diazo components are suitable for an aftertreatment with chromium compounds, on the fiber, whereby fast olive-brown to olive-gray or olive-green shades are obtained. Finally some of the dyestuffs prepared according to the present invention are suitable for dyeing leather.

Hitherto the 1-arylamino-7-hydroxynaphthalene-sulfonic acids employed as coupling components for the manufacture of the present new dyestuffs have not been described, and they also have not been used for the manufacture of any other azo dyestuffs. They may be prepared according to several known methods, for instance, by heating 1-amino-7-hydroxynaphthalene-3- or -4-sulfonic acids together with aromatic amines in the presence of salts of these amines, whereby the amino group is arylated, or by acting with sulfonating agents on 1-arylamino-7-hydroxynaphthalenes. The 1-arylamino-7-hydroxynaphthalene-sulfonic acids substituted in the 2-position of the naphthalene nucleus by the radicle of a diazo compound of the benzene or naphthalene series may be prepared by combining in an acid medium the diazo compound of an aromatic amine of the benzene or naphthalene series with a 1-arylamino-7-hydroxynaphthalene-sulfonic acid.

In order to further illustrate our invention the following examples are given, the parts being by weight. We wish it, however, to be understood that our invention is not limited to the particular products or reaction conditions mentioned therein.

Example 1

17.3 parts of 1-aminobenzene-2-sulfonic acid are diazotized in the usual manner and the diazo solution obtained is allowed to run into an aqueous solution of 34.5 parts of 1-(4'-methoxyphenylamino)-7-hydroxynaphthalene-4-sulfonic acid containing an excess of sodium carbonate. When the combination is complete, the dyestuff formed of the formula

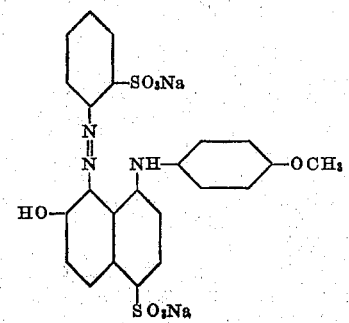

is separated and dried. It is a black powder, soluble in concentrated sulfuric acid with an orange-red and in water with a red-brown color, and dyes wool deep brown shades of good fastness properties, especially of a very good fastness to light.

By employing the corresponding amount of 4-nitro-1-aminobenzene-2-sulfonic acid as diazo component, a dyestuff is obtained which dyes wool deep dark-green shades.

*Example 2*

26.5 parts of 2-aminodiphenylether-4-sulfonic acid are diazotized in the usual manner and the diazo solution obtained is allowed to run into an aqueous solution of 31.5 parts of 1-phenylamino-7-hydroxynaphthalene-4-sulfonic acid containing an excess of sodium carbonate. The mixture is stirred until the combination is complete. Then the dyestuff formed of the formula

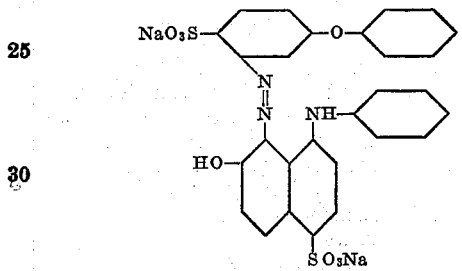

is separated and dried. It is a black powder, soluble in concentrated sulfuric acid with a bluish-red and in water with a red-brown color, and dyes wool and silk dark-brown shades of good fastness properties especially of a good fastness to light.

The analogous dyestuff obtained with 1-phenylamino-7-hydroxynaphthalene-3-sulfonic acid as coupling component yields dyeings of somewhat deeper dark-brown shades of equally good fastness properties.

Very similar dyestuffs are formed by employing 4-aminodiphenylether-2-sulfonic acid as diazo component.

*Example 3*

The diazo solution obtained by diazotizing 17.2 parts of 1-aminobenzene-3-sulfamide is allowed to run into an aqueous solution of 31.5 parts of 1-phenylamino-7-hydroxynaphthalene-3-sulfonic acid containing an excess of sodium carbonate. The mixture is stirred until the combination is complete. Then the dyestuff formed of the formula

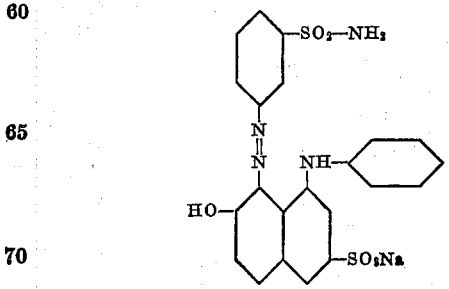

is separated and dried. It is a black powder, soluble in concentrated sulfuric acid with an orange-brown and in water with a red-brown color, and dyes wool dark-brown shades of good fastness to light, fulling and perspiration. The dyestuff has a good levelling power.

*Example 4*

27 parts of 1-aminobenzene-3-(N-ethyl-N-phenylsulfamide) are diazotized in the usual manner and the diazo solution obtained is combined with an aqueous solution of 31.5 parts of 1-phenylamino-7-hydroxynaphthalene-3-sulfonic acid containing an excess of sodium carbonate. The mixture is stirred until the combination is complete. Then the dyestuff formed of the formula

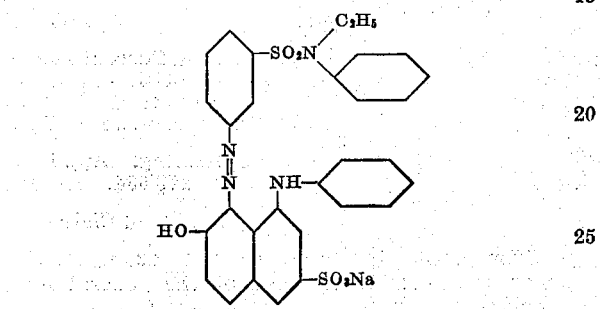

is separated and dried. It is a black powder, soluble in concentrated sulfuric acid with an orange-brown and in water with a dark-brown color, and dyes wool and silk from a weakly acid or neutral bath dark-brown shades of very good fastness to fulling, light, seawater and perspiration.

Instead of the 1-phenylamino-7-hydroxynaphthalene-3-sulfonic acid there may also be employed sulfonic acids of the 1-phenylamino-7-naphthol substituted in the benzene nucleus as, f. i.:

1-(2'-methoxyphenylamino)-7-hydroxynaphthalene-3-sulfonic acid 1-(4'-methoxyphenylamino)-7-hydroxynaphthalene-3-sulfonic acid 1-(2'-methylphenylamino)-7-hydroxynaphthalene-3-sulfonic acid 1-(3'-methylphenylamino)-7-hydroxynaphthalene-4-sulfonic acid 1-(4-methylphenylamino)-7-hydroxynaphthalene-4-sulfonic acid 1-(2',4'-dimethyl-phenylamino)-7-hydroxynaphthalene-4-sulfonic acid 1-(2',5'-dimethyl-phenylamino)-7-hydroxynaphthalene-4-sulfonic acid 1-(4'-hydroxy-phenylamino)-7-hydroxynaphthalene-4-sulfonic acid 1-(3'-carboxy-phenylamino)-7-hydroxynaphthalene-4-sulfonic acid 1-(4'-sulfo-phenylamino)-7-hydroxynaphthalene-4-sulfonic acid 1-(4'-hydroxy-3'-carboxy-phenylamino)-7-hydroxynaphthalene-4-sulfonic acid whereby the shades of the dyeings and the solubility of the dyestuffs may be varied to a certain degree.

*Example 5*

The diazo solution obtained by diazotizing 18.9 parts of 2-amino-1-hydroxybenzene-4-sulfonic acid is combined with an aqueous solution of 31.5 parts of 1-phenylamino-7-hydroxynaphthalene-3-sulfonic acid containing an excess of sodium carbonate. When the formation of the dyestuff is complete the dyestuff of the formula

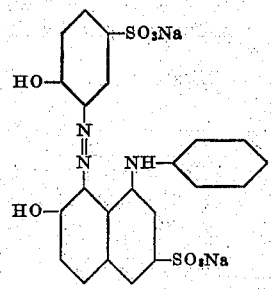

is separated and dried. It is a black powder, soluble in dilute acids with a red-brown, in a sodium carbonate solution with a blue and in concentrated sulfuric acid with a bluish red color, and dyes wool gray shades turning when afterchromed into olive-gray shades of very good fastness to fulling, potting and light.

*Example 6*

17.8 parts of 4,6-dichloro-2-amino-1-hydroxybenzene are diazotized in the usual manner and the diazo solution obtained is allowed to run into an aqueous solution of 31.5 parts of 1-phenylamino-7-hydroxynaphthalene-3-sulfonic acid containing an excess of sodium carbonate. The mixture is stirred until the combination is complete. Then the dyestuff formed of the formula

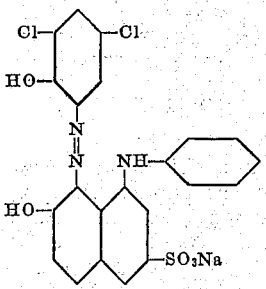

is separated and dried. It represents a greenish black powder, soluble in a sodium carbonate solution with a blue, in dilute mineral acids with an olive-green and in concentrated sulfuric acid with a violet color. It dyes wool from an acid bath greenish-gray shades turning when afterchromed into olive-gray shades of excellent fastness properties, especially to fulling, hot-pressing, potting and light.

By employing instead of 4, 6-dichloro-2-amino-1-hydroxybenzene the 6-chloro-2-amino-1-hydroxybenzene or the 3, 4, 6-trichloro-2-amino-1-hydroxybenzene, and instead of the 1-phenylamino-7-hydroxynaphthalene-3-sulfonic acid the 1 - (2'-methoxy-phenylamino) - 7 -hydroxynaphthalene-3-sulfonic acid,
1 - (4'-methoxy-phenylamino) - 7 -hydroxynaphthalene-3-sulfonic acid,
1 - (2' - methyl-phenylamino) - 7 -hydroxynaphthalene-3-sulfonic acid,
1 - (4' - methyl-phenylamino) - 7 -hydroxynaphthalene-3-sulfonic acid or the 1-(2', 4'-dimethyl-phenylamino)-7-hydroxynaphthalene-3-sulfonic acid dyestuffs are obtained which dye wool when afterchromed olive-gray shades having the same excellent fastness properties.

*Example 7*

15.4 parts of 4-nitro-2-amino-1-hydroxybenzene are diazotized in the usual manner and the diazo solution obtained is combined with an aqueous solution of 31.5 parts of 1-phenylamino-7-hydroxynaphthalene-3-sulfonic acid containing an excess of sodium carbonate. When the combination is complete the dyestuff formed of the formula

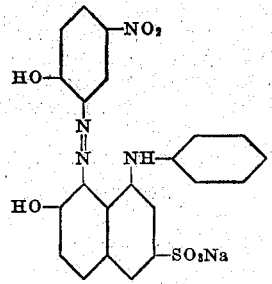

is separated and dried. It is a black powder, soluble in water with an olive-green, in dilute acids with a dirty green and in concentrated sulfuric acid with a bluish-red color. The dyestuff dyes wool from an acid bath greenish-gray shades which by after-chroming are converted into yellowish-olive shades of excellent fastness properties, particularly to fulling, potting, hot-pressing and light.

*Example 8*

A diazo solution obtained in the usual manner by diazotizing 12.1 parts of 3-aminobenzaldehyde is introduced while cooling into an aqueous solution of 31.5 parts of 1-phenylamino-7-hydroxynaphthalene-3-sulfonic acid containing an excess of sodium carbonate. The mixture is stirred until the combination is complete. Then the dyestuff formed of the formula

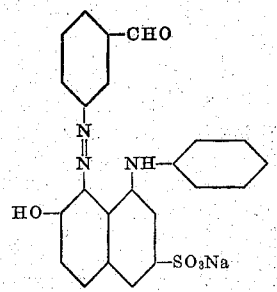

is separated and dried. It is a black powder which dissolves in water with a dark brown, and in concentrated sulfuric acid with an orange-red color. It dyes wool from an acetic acid containing or neutral bath dark brown shades of excellent fastness properties, especially to perspiration, sea-water, fulling and light. The dyestuff is also distinguished by a good levelling power.

*Example 9*

A diazo solution prepared in the usual manner from 18.6 parts of 4-amino-1-methylbenzene-2-sulfamide is combined while cooling with an aqueous solution of 31.5 parts of 1-phenylamino-7-hydroxynaphthalene-3-sulfonic acid containing an excess of sodium carbonate. When the combination is complete the dyestuff formed of the formula

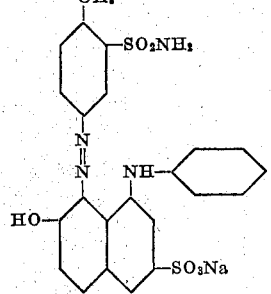

is separated and dried. It is a black powder, soluble in water with a dark brown and in concentrated sulfuric acid with a red color. It dyes wool from an acid or neutral bath deep dark-brown shades distinguished by good fastness properties, especially by a good fastness to light.

A similar dyestuff is obtained by employing instead of the 4-amino-1-methylbenzene-2-sulfamide the 4-amino-1-methylbenzene-2-sulfomethylamide.

Example 10

29.4 parts of 4-(benzoyl-cyclohexylamino)-1-aminobenzene are diazotized in the usual manner and the diazo solution obtained is combined with an aqueous solution of 31.5 parts of 1-phenylamino-7-hydroxynaphthalene-3-sulfonic acid containing an excess of sodium carbonate. The mixture is stirred until the combination is complete. Then the dyestuff formed of the formula

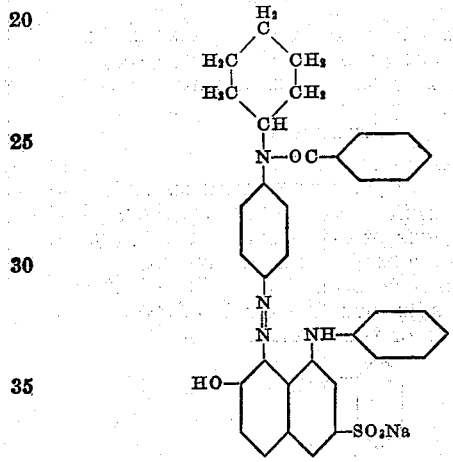

is isolated. It is when dry a black powder, soluble in water with a dark brown and in concentrated sulfuric acid with a red color. It dyes wool from an acid or neutral bath dark brown shades of excellent fastness properties, especially to fulling, perspiration, potting, and a good fastness to light.

By employing instead of 4-(benzoyl-cyclohexylanimo)-1-aminobenzene the 4-(benzoyl-n-butylamino)-1-aminobenzene, the 4-(caprinyl-n-butylamino)-1-aminobenzene, the 4-(propionyl-cyclohexylamino)-1-aminobenzene or the 4-(2',5'-dichlorobenzoyl-cyclohexylamino)-1-aminobenzene, dyestuffs are obtained dyeing wool dark brown shades of similar good fastness properties.

Example 11

22.3 parts of 1-aminonaphthalene-4-sulfonic acid are diazotized in the usual manner and the diazo solution obtained is allowed to run into an aqueous solution of 31.5 parts of 1-phenylamino-7-hydroxynaphthalene-3-sulfonic acid containing an excess of sodium carbonate. The mixture is stirred until the combination is complete. Then the dyestuff formed of the formula

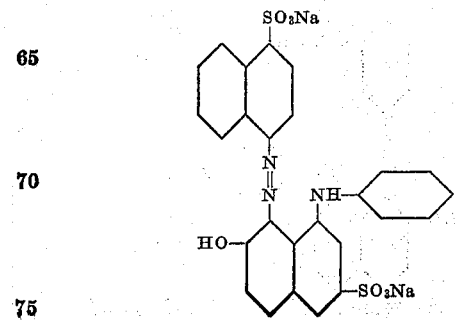

is separated and dried. It is a dark powder, soluble in water with a gray, in concentrated sulfuric acid with a violet color. It dyes wool from an acid bath fast gray to black shades.

Example 12

17.2 parts of 1-aminobenzene-4-sulfamide are diazotized in the usual manner. The acid diazo solution obtained is combined with a neutral solution of 33.8 parts of the sodium salt of the 1-phenylamino-7-hydroxynaphthalene-3-sulfonic acid, while stirring until the combination is complete. The monoazo dyestuff thus obtained is isolated and dissolved in water in the presence of an excess of sodium carbonate. Into this solution the diazo solution is introduced which is obtained in the usual manner by diazotizing 24 parts of 1-amino-4-(benzoylethylamino)-benzene. When the combination is complete the disazodyestuff formed of the formula

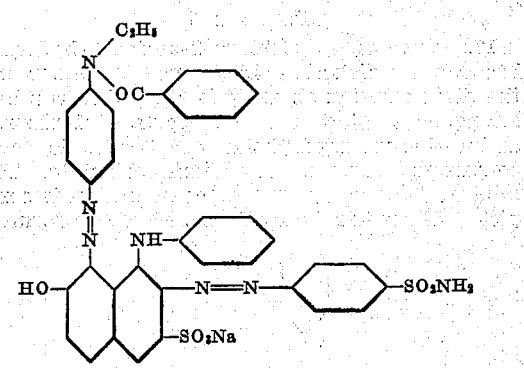

is separated and dried. It is soluble in water with a brown and in concentrated sulfuric acid with a bluish red color and dyes wool from an acid bath full neutral brown shades, having very good fastness properties, especially to fulling and perspiration, and a good fastness to light.

Similar dyestuffs are obtained by employing instead of the 1-phenylamino-7-hydroxynaphthalene-3-sulfonic acid derivatives thereof which are substituted in the benzene nucleus as, for instance, 1-(2'-methoxyphenylamino)-7-hydroxynaphthalene-3-sulfonic acid,
1-(4'-methoxyphenylamino)-7-hydroxynaphthalene-3-sulfonic acid,
1-(2'-methylphenylamino)-7-hydroxynaphthalene-3-sulfonic acid,
1-(4'-methylphenylamino)-7-hydroxynaphthalene-3-sulfonic acid,
1-(2',4'-dimethylphenylamino)-7-hydroxynaphthalene-3-sulfonic acid or 1-(2',5'-dimethylphenylamino)-7-hydroxynaphthalene-3-sulfonic acid.

Example 13

13.8 parts of 3-nitro-1-aminobenzene are diazotized in the usual manner and the obtained diazo solution is combined in an acid medium with 31.5 parts of 1-phenylamino-7-hydroxynaphthalene-4-sulfonic acid. When the combination is complete the monoazodyestuff formed is separated and dissolved in water containing an excess of sodium carbonate. Into this solution the diazo solution is introduced obtained by diazotizing 24 parts of 1-amino-4-(benzoylethylamino)-benzene. The disazo dyestuff formed of the formula

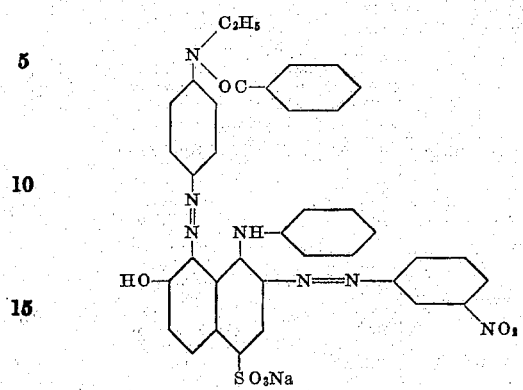

is separated and dried. It is a dark powder, soluble in water with a brown and in concentrated sulfuric acid with a claret red color. It dyes wool from an acetic acid containing bath brown shades of very good fastness properties, especially to fulling, washing and perspiration, and of good fastness to light.

By employing instead of the 1-phenylamino-7-hydroxynaphthalene-4-sulfonic acid the 1-(2'-methoxyphenylamino)-7-hydroxynaphthalene-4-sulfonic acid,
1-(4'-methoxyphenylamino)-7-hydroxynaphthalene-4-sulfonic acid,
1-(2'-methylphenylamino)-7-hydroxynaphthalene-4-sulfonic acid,
1-(4'-methylphenylamino)-7-hydroxynaphthalene-4-sulfonic acid,
1-(2',4'-dimethylphenylamino)-7-hydroxynaphthalene-4-sulfonic acid or 1-(2'-chlorophenylamino)-7-hydroxynaphthalene-4-sulfonic acid dyestuffs are obtained dyeing wool similar shades of equally good fastness properties.

Example 14

A diazo solution obtained in the usual manner by diazotizing 13.5 parts of 1-amino-3-acetylaminobenzene is allowed to run into a neutral solution of 33.8 parts of the sodium salt of 1-phenylamino-7-hydroxynaphthalene-3-sulfonic acid while stirring until the combination is complete. The monoazodyestuff obtained is isolated and dissolved in water containing an excess of sodium carbonate. This solution is then combined with a suspension of the diazo compound obtained in the usual manner by diazotizing 16.8 parts of 4-methyl-6-nitro-2-amino-1-hydroxybenzene. Then the mixture is stirred until the combination is complete. The disazo dyestuff formed of the formula

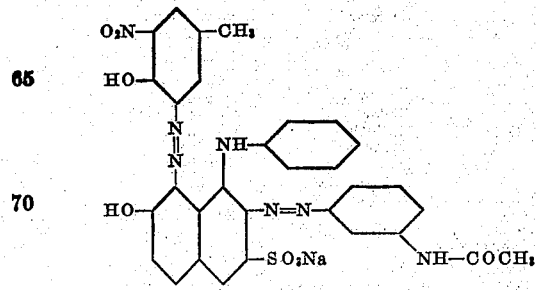

is isolated and dried. It is a dark powder, soluble in a sodium carbonate solution with a greenish-brown, in dilute mineral acid solution with a red-brown and in concentrated sulfuric acid with a claret-red color. It dyes wool olive-green shades which when afterchromed are converted into olive-brown shades of very good fastness properties, especially to fulling and light.

Example 15

22.3 parts of 1-aminonaphthalene-4-sulfonic acid are diazotized and the diazo solution obtained is combined in the presence of an excess of sodium carbonate with a solution of 47.6 parts of the monoazo dyestuff, which is obtained by combining diazotized 1-amino-3-acetylaminobenzene with 1-phenylamino-7-hydroxynaphthalene-3-sulfonic acid in an acid medium. When the combination is complete the disazo dyestuff formed of the formula

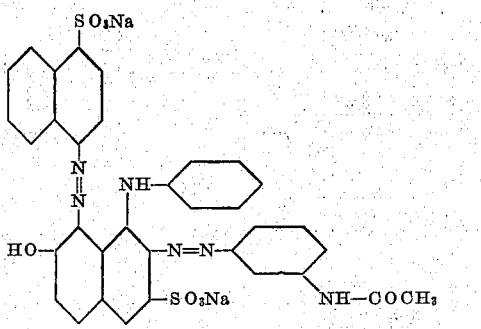

is separated and dried. It is a dark powder, soluble in water with a brown and in concentrated sulfuric acid with a violet color. It dyes wool fast brown shades.

Example 16

22.3 parts of 1-aminonaphthalene-4-sulfonic acid are diazotized and the acid diazo suspension is combined with a neutral solution of 31.5 parts of 1-phenylamino-7-hydroxynaphthalene-3-sulfonic acid. When the combination is complete the mixture is rendered weakly alkaline by the addition of a sodium carbonate solution. The formed monoazo dyestuff is precipitated by the addition of salt, and redissolved in water with the addition of an excess of sodium carbonate. Then the solution obtained is allowed to run slowly while stirring into a diazo solution obtained by diazotizing in the usual manner 29.4 parts of 1-amino-4-(benzoyl-cyclohexylamino)-benzene. After having stirred the mass for some time the disazo dyestuff formed of the formula

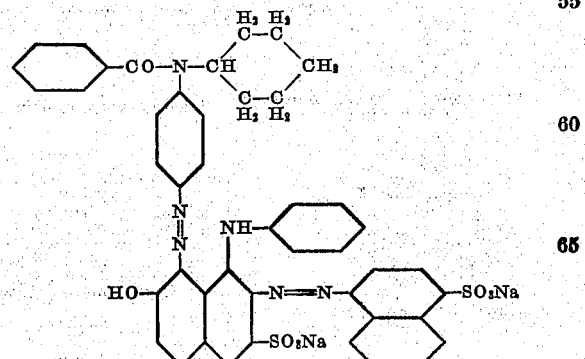

is isolated and dried. It is a brown powder soluble in water with a brown and in concentrated sulfuric acid with a brownish-red color. Animal fibers are dyed in fast brown shades.

Further dyestuffs obtainable according to the present invention are indicated in the following tables:

| Diazo component | Coupling component | Coloration of the solution in concentrated sulfuric acid | Shade of the dyeing on wool |
|---|---|---|---|
| Aminobenzene | 1-phenylamino-7-hydroxynaphthalene-3-sulfonic acid. | Scarlet | Reddish-brown. |
| 3-methyl-1-amino-benzene | ___do___ | Red | Brown. |
| 4-chloro-3-methyl-1-aminobenzene | ___do___ | Bluish-red | Reddish-brown. |
| 3-chloro-1-amino-benzene | ___do___ | Red | Dark-brown. |
| 4-methoxy-1-amino-benzene | ___do___ | Violet | Violet-brown. |
| 3-nitro-1-amino-benzene | ___do___ | Light brown | Greenish-brown. |
| 4-nitro-1-amino-benzene | ___do___ | Brown-red | Green. |
| 3-acetylamino-1-aminobenzene | ___do___ | Brownish-orange | Red-brown. |
| Do | 1-phenylamino-7-hydroxynaphthalene-4-sulfonic acid. | Orange | Do. |
| 4-acetylamino-1-aminobenzene | ___do___ | Red | Greenish-brown. |
| 2-amino-4-acetyl-amino-1-methylbenzene | ___do___ | ___do___ | Dark brown. |
| 1-aminobenzene-3-sulfonic acid | 1-phenylamino-7-hydroxynaphthalene-3-sulfonic acid. | Orange | Do. |
| 1-amino-3-acetyl-aminobenzene-6-sulfonic acid. | ___do___ | Brick red | Do. |
| 1-aminobenzene-3-sulfamide | 1-phenylamino-7-hydroxynaphthalene-4-sulfonic acid. | Orange | Red-brown. |
| 1-aminobenzene-4-sulfomethyl-amide | 1-phenylamino-7-hydroxynaphthalene-3-sulfonic acid. | ___do___ | Dark brown. |
| 1-aminobenzene-3-sulfo-diethyl-amide | ___do___ | ___do___ | Do. |
| 1-aminobenzene-sulfamide-6-sulfonic acid | ___do___ | Brownish-orange | Do. |
| 1-aminobenzene-3-sulfethylanilide | 1-phenylamino-7-hydroxynaphthalene-4-sulfonic acid. | Red | Do. |
| 1-(acetylethylamino)-4-aminobenzene-2-sulfonic acid. | 1-phenylamino-7-hydroxynaphthalene-3-sulfonic acid. | Orange | Blackish-brown. |
| 2-aminodiphenylsulfone | ___do___ | Red | Dark brown. |
| 1-aminobenzene-4-methylsulfone | ___do___ | Brownish-orange | Brown-olive. |
| 1-aminobenzene-4-ethylsulfone-2-sulfonic acid. | ___do___ | Orange | Dark brown. |
| 2-aminobenzoic acid | ___do___ | Red | Reddish-brown. |
| 3-aminobenzoic acid | ___do___ | Brownish-orange | Dark brown. |
| 5-nitro-2-aminobenzoic acid | ___do___ | Red | Reddish-brown |
| 3-aminobenzoyl-amide | ___do___ | Orange | Dark brown. |
| Do | 1-phenylamino-7-hydroxynaphthalene-4-sulfonic acid. | Red | Do. |
| 4-aminobenzoylamide | ___do___ | ___do___ | Greenish-brown. |
| Do | 1-phenylamino-7-hydroxynaphthalene-3-sulfonic acid. | Orange | Grayish-brown. |
| 4-aminobenzoyl-di-n-butylamide | ___do___ | Brownish-orange | Dark brown. |
| Do | 1-phenylamino-7-hydroxynaphthalene-4-sulfonic acid. | Red | Do. |
| 1-aminobenzene-2-carboxylic acid methylester. | 1-phenylamino-7-hydroxynaphthalene-3-sulfonic acid. | ___do___ | Reddish-brown. |
| 3-aminobenzoyl-di-isohexylamine | ___do___ | Orange | Dark brown. |
| 3'-aminobenzoyl-n-butyl-1-naphthylamine | ___do___ | ___do___ | Violetish-brown. |
| 4'-aminobenzoyl-ethyl-1-naphthyl-amine | 1-phenylamino-7-hydroxynaphthalene-4-sulfonic acid. | Red | Do. |
| 4-aminobenzoyl-cyclohexylaniline | ___do___ | ___do___ | Dark brown. |
| 4-aminobenzoyl-iso-octyl-aniline | 1-phenylamino-7-hydroxynaphthalene-3-sulfonic acid. | Orange | Do. |
| 1-succinylamino-3-amino-4-nitrobenzene | ___do___ | Red | Olive. |
| 4-(ethyl-caprinyl)-amino-2-aminotoluene | ___do___ | ___do___ | Dark brown. |
| 1-amino-3-acetyl-aminobenzene | 1-(2'-methoxyphenylamino)-7-hydroxynaphthalene-3-sulfonic acid. | Orange | Do. |
| 4-amino-1-methylbenzene-2-sulfamide | ___do___ | ___do___ | Olive-brown. |
| 1-amino-4-(benzoyl-ethyl)-aminobenzene | 1-(4'-methoxyphenyl-amino)-7-hydroxynaphthalene-3-sulfonic acid. | Red | Dark brown. |
| 4-methyl-6-nitro-2-aminophenol | 1-phenylamino-7-hydroxynaphthalene-3-sulfonic acid. | Violet | Greenish-gray (olive-gray when after-chromed). |
| 6-chloro-2-aminophenol | 1-phenylamino-7-hydroxynaphthalene-4-sulfonic acid. | Bluish red | Grayish brown (when after-chromed: olive-gray). |

The following disazo dyestuffs are formed, in each case the coupling component being the 1-phenylamino-7-hydroxynaphthalene-3-sulfonic acid:

| Diazo component combined in an acid medium | Diazo component combined in an alkaline medium | Coloration of the solution in concentrated sulphuric acid | Shade of the dyeing on wool |
|---|---|---|---|
| 5-nitro-2-amino-1-methoxybenzene | 1-amino-4-(benzoyl-ethyl)-aminobenzene | Claret-red | Dark brown. |
| 4-nitro-2-amino-1-methoxybenzene | 1-aminobenzene-3-sulfanilide | ___do___ | Brown. |
| 2-chloro-1-aminobenzene | 1-amino-3-benzoyl-aminobenzene | ___do___ | Do. |
| 4-chloro-1-aminobenzene | 1-aminobenzene-3-carboxylic acid methylester | ___do___ | Do. |
| 1-aminobenzene-3-sulfanilide | 1-aminobenzene-2-carboxylic acid | ___do___ | Yellowish-brown. |
| 3-nitro-1-aminobenzene | 4-amino-1-methylbenzene-2-sulfanilide | ___do___ | Brown. |
| 4-nitro-1-aminobenzene | 1-aminobenzene-2-sulfonic acid | Violet | Reddish-brown. |
| 2,4-dichloro-1-aminobenzene | 1-amino-4-(benzoyl-ethyl)-aminobenzene | Corinth | Brown. |
| 2-chloro-4-nitro-1-amino-benzene | ___do___ | Claret-red | Reddish-brown. |
| 1-amino-3-acetyl-aminobenzene | 1-amino-3-acetyl-aminobenzene | Red | Light-brown. |
| Do | Aniline | ___do___ | Do. |
| Do | 4-nitro-1-aminobenzene | ___do___ | Olive. |
| Do | 1-amino-4-acetyl-aminobenzene | ___do___ | Havanna-brown. |
| 1-aminobenzene-4-sulfamide | 1-amino-4-(benzoyl-cyclohexyl)-amino-benzene | Bluish-red | Brown. |
| Do | 2-amino-4-(caprinyl-ethyl)-amino-1-methylbenzene | ___do___ | Do. |
| 1-amino-3-acetyl-aminobenzene | 4-nitro-2-amino-1-hydroxybenzene | Red | Havanna-brown (same shade when after-chromed). |

We claim:
1. The azo dyestuffs of the general formula:

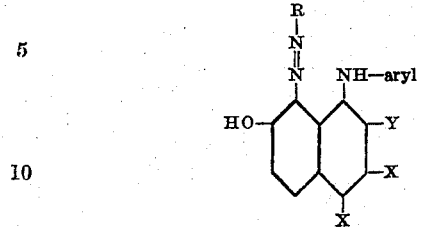

wherein one X stands for a sulfonic acid group and the other X stands for hydrogen, R stands for a member selected from the group consisting of aromatic radicles of the benzene and naphthalene series, Y stands for a member selected from the group consisting of hydrogen and —N=N—R, and aryl means a radicle of the benzene series, which dyestuffs dye animal fibers various shades of good fastness properties.

2. The azo dyestuff of the formula:

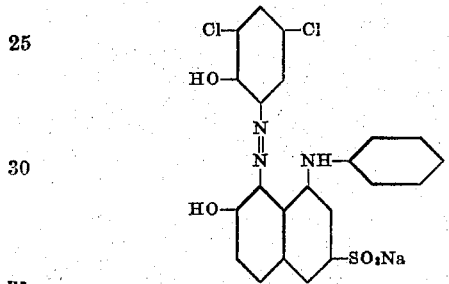

which is a greenish black powder and dyes wool greenish-gray shades of excellent fastness properties, especially to fulling, hot-pressing, potting and light.

3. The azo dyestuff of the formula:

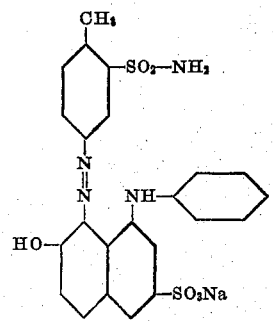

which is a black powder and dyes wool deep dark-brown shades of good fastness properties.

4. The azo dyestuff of the formula:

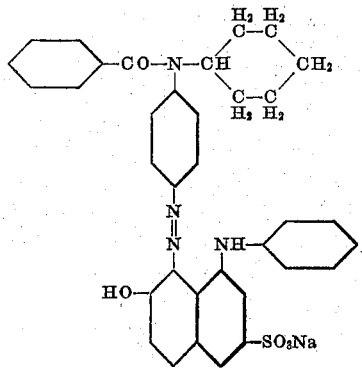

which is a black powder and dyes wool dark-brown shades of excellent fastness properties, especially to fulling, potting and perspiration.

RICHARD FLEISCHHAUER.
ADOLF MÜLLER.